United States Patent [19]

Farmer, Jr. et al.

[11] 4,437,120

[45] Mar. 13, 1984

[54] DRIVE LEVEL CONTROL SYSTEM FOR TESTING KINESCOPES

[75] Inventors: Felta C. Farmer, Jr., Gas City; Donald P. Knight, Marion, both of Ind.

[73] Assignee: RCA Corporation, New York, N.Y.

[21] Appl. No.: 346,372

[22] Filed: Feb. 5, 1982

[51] Int. Cl.³ .......................................... H04N 7/02
[52] U.S. Cl. ..................................... 358/139; 358/172
[58] Field of Search ............... 358/10, 21 V, 139, 176, 358/242, 172; 328/173, 175, 231; 307/264; 340/345, 351; 324/404

[56] References Cited

U.S. PATENT DOCUMENTS

| | | | |
|---|---|---|---|
| 2,947,936 | 8/1960 | Stone | 324/404 |
| 3,207,998 | 9/1965 | Corney et al. | 358/172 |
| 3,461,234 | 8/1969 | Slusarski et al. | 178/7.5 |
| 3,487,165 | 12/1969 | Anderson et al. | 178/7.5 |
| 3,543,169 | 11/1970 | Hill | 328/151 |
| 3,985,954 | 10/1976 | Kuniyoshi et al. | 178/7.3 |
| 4,170,785 | 10/1979 | Yoshida et al. | 358/242 |
| 4,245,237 | 1/1981 | Lagoni | 358/22 |

*Primary Examiner*—John C. Martin
*Assistant Examiner*—Michael D. Parker
*Attorney, Agent, or Firm*—Eugene M. Whitacre; Dennis H. Irlbeck; Lester L. Hallacher

[57] ABSTRACT

A drive level control circuit for testing a kinescope detects the vertical blanking pulses and provides a DC voltage, the level of which is proportional to the level of the blanking pulses. The vertical sync pulses are used to gate the circuit during vertical blanking. The DC voltages is compared to a reference voltage and the result of the comparison is used to control the drive level to an element of the electron gun in the kinescope.

6 Claims, 1 Drawing Figure

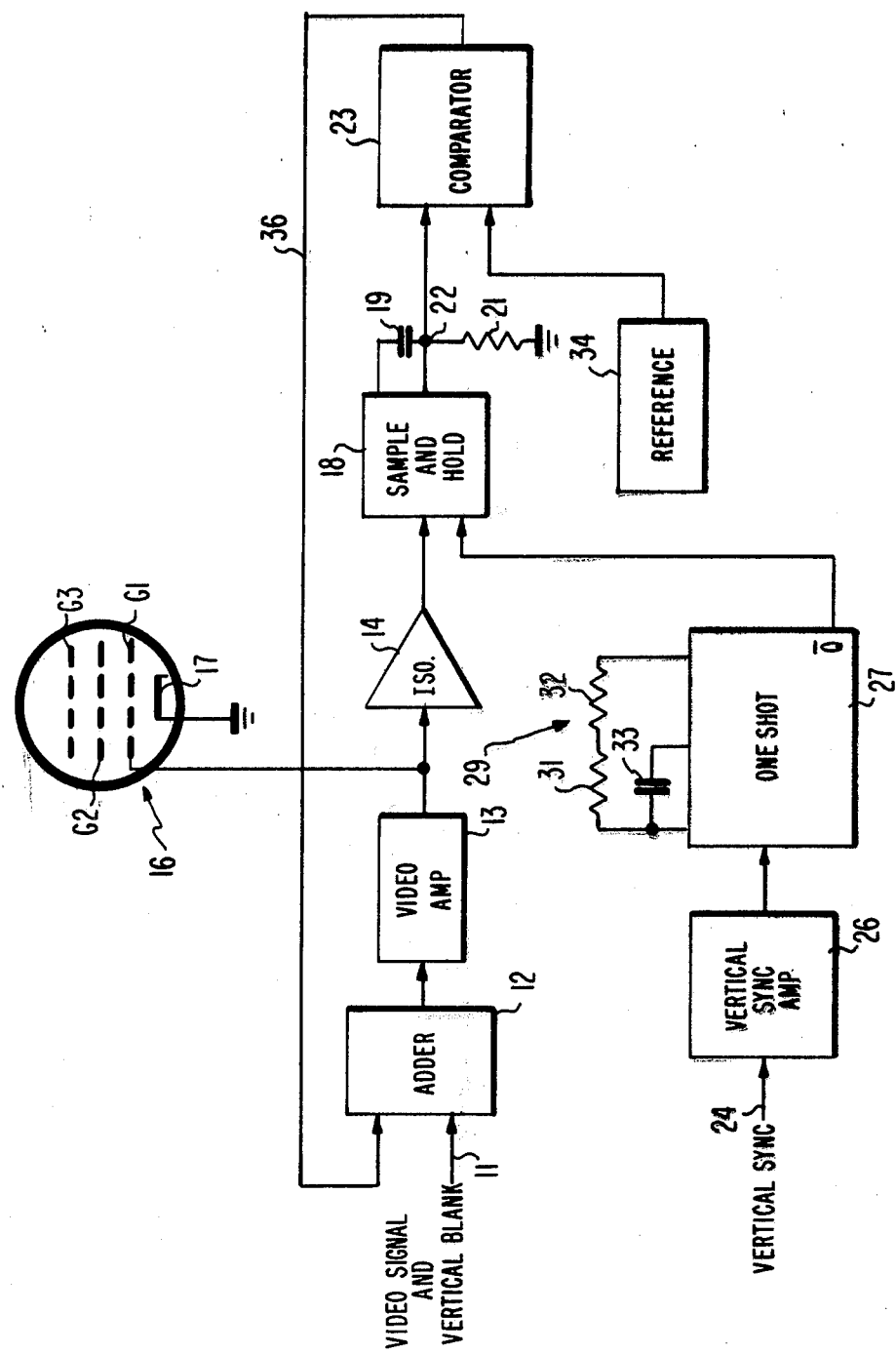

DRIVE LEVEL CONTROL SYSTEM FOR TESTING KINESCOPES

BACKGROUND OF THE INVENTION

This invention relates generally to kinescopes for television receivers and particularly to a drive level control system for use in testing such tubes.

The precise control of the video drive level of a kinescope is required during the visual testing which takes place after the final steps of the manufacturing process are completed. During such testing the completed kinescopes are mounted in a test fixture which is used to apply the video drive voltage to the kinescope. In order to assure that every kinescope is tested under substantially identical conditions, it is necessary to precisely control the video drive level of the test set. In the absence of precise control of the test conditions, the results can indiscriminately vary and lose significance. This is particularly true because the tests, typically are subjective visual tests which, are performed by the human eye. For example, one of the tests is the ability of the tube to properly focus. In this tests, a pattern, such as a grid, is placed on the screen. A tube which properly focuses the electron beams will create sharp, fine lines in the grid pattern. However, variations in the video drive level can cause the electron beams to spread on the screen and the grid lines in the corners will spread, or flair. Thus, an acceptable tube can be improperly rejected because of of a variation in the test voltage.

The instant invention overcomes these difficulties by the provision of a system which automatically maintains a uniform video drive level on the electron gun of a kinescope.

SUMMARY OF THE INVENTION

A drive level control for testing a kinescope includes means for receiving the vertical blanking pulses and for providing a voltage proportional to the level of the blanking pulses. The vertical synchronizing pulses gate the means for receiving in accordance with the initial transition of the synchronizing pulses. Comparator means is responsive to a reference level and to the proportional voltage and provides an error signal which is used to maintain the drive signal to the electron gun of the kinescope at a constant level.

BRIEF DESCRIPTION OF THE DRAWINGS

The FIGURE is a preferred embodiment of the instant invention.

DETAILED DESCRIPTION OF THE PREFERRED EMBODIMENT

In the FIGURE, the video signal and the vertical blanking pulse which are used in the operation of a television receiver are supplied by a test set to an input lead 11 of an adder circuit 12. The adder circuit 12 is of standard configuration known to those skilled in the art. The output of the adder 12 is provided to a video amplifier 13, the output of which is provided to an isolation network 14 and the $G_1$ grid of a kinescope 16. The kinescope 16 also includes a cathode 17, and $G_2$ and $G_3$ grids and operates in a manner known to those skilled in the television art. Typically, in the operation of a kinescope, the video signal and the vertical blanking pulse are applied to the cathode and such operation is possible with the instant invention. However, for test purposes, it is preferable to apply the video signal and the vertical blank signal to the $G_1$ grid because the same voltage can then be used for all three guns. The test equipment is thereby substantially simplified while the accuracy of the test is maintained.

The isolation network 14 also is of standard configuration and provides high voltage isolation between high and low voltage components of the system. For example, the isolation network 14 protects the other components of the system from high voltage arcs which can occur in the kinescope 16. However, a primary function of the isolation network 14 is to serve as a detector of the signal which is applied by the video amplifier 13 to the $G_1$ grid of the kinescope 16.

The output of the isolation network 14 is applied to a sample and hold circuit 18 which also is of a standard configuration. The output of the sample and hold circuit 18 is applied to the series connection of a capacitor 19 and a resistor 21. The voltage at a junction 22 of the capacitor and resistor serves as the input to a comparator 23. The sample and hold circuit 18 receives the output of the video amplifier 13 through the isolation network 14 and serves to charge the capacitor 19 to a level which is proportional to the output voltage from the video amplifier 13 and which thus is proportional to the voltage on the $G_1$ grid of the kinescope 16. Accordingly, the voltage of the junction 22 is proportional to the amplitude of the vertical blank which is input to the adder 12.

A signal which simulates the vertical sync signal of a television receiver is applied to an input lead 24 of a vertical sync amplifier 26. The output of the vertical sync amplifier is applied to the Set input of a one-shot multivibrator 27, the $\overline{Q}$ output of which is connected by the line 28 to the sample and hold circuit 18.

Associated with the one-shot 27 is an RC network 29 including two series resistors 31 and 32 and a capacitor 33. The values of the resistors 31, 32 and the capacitor 33 are selected so that the time constant of the RC network 29 is less than the duration of the vertical synchronizing pulses applied to the one-shot 27 from the vertical synch amplifier 26. Accordingly, the initial transition of the vertical sync pulse from the vertical sync amplifier 26 resets the one-shot 27 and the $\overline{Q}$ output goes high and turns on the sample and hold circuit 18. The RC network 29 times out before the final transition of the vertical sync pulse is received. Accordingly, the $\overline{Q}$ output of the one-shot 27 changes in a time period which is less than the duration of the vertical sync and the sample and hold circuit 18 is turned off prior to the cessation of such pulse. The vertical sync amplifier 26 and the one-shot multivibrator 27 therefore serve as a switch to turn the sample and hold circuit on and off. The switching rate of the sample and hold 18 is substantially more rapid than the repetition rate of the vertical blanking pulse. Also, the sample and hold 18 is turned on during the presence of the vertical blanking pulse. Accordingly, the capacitor 19 is charged to a level which is proportional to the level of the vertical blanking pulse. Thus, by using the vertical blanking and vertical synchronizing pulses, the switching is sufficiently rapid to permit full charging of the capacitor 19. However, the frequency of the vertical pulses is much lower than the horizontal pulses and therefore less complex and expensive circuitry can be used.

A reference voltage generator 34 provides an output having a voltage level which is indicative of the drive level desired for the $G_1$ grid of the kinescope 16. Accordingly, the voltage which is proportional to the blanking pulse level available at the junction 22 is compared with the reference voltage drive signal in the comparator 23 to provide an error signal. The error signal from the comparator 23 is provided over the line 36 to the input of the adder 12 and the actual signal input to the adder 12 is adjusted in accordance with the error signal to maintain the voltage applied to the $G_1$ grid of kinescope 16 at a constant level.

The comparator 23 can be either an analog or a digital comparator. Thus, when an analog comparator is used, the analog signal available at the junction 22 of the capacitor 19 and resistor 21 can be compared to an analog reference signal from the reference generator 34. In such instance, the comparator 23 will be an analog comparator, such as an operational amplifier. Alternatively, if desired, the comparator 23 can be a microprocessor containing an analog-to-digital converter (A/D). In this case, the analog signal available at the junction 22 is applied to the A/D and the reference voltage available from the reference signal generator 34 is in digital form. When the comparator 23 is digital, a digital to analog converter is provided between the comparator 23 and the adder 12 to convert the error signal to analog form prior to application to the AGC circuit 12.

In operation, the vertical blanking pulse is received by the adder circuit 12 and is applied through the video amplifier 13 to both the $G_1$ grid of the kinescope 16 and the isolation network 14. The output of the isolation network 14 is provided to the sample and hold circuit 18. However, the capacitor 19 cannot charge until the sample and hold circuit 18 is gated on by the vertical sync amplifier 26 through the one-shot multivibrator 27. When a vertical sync signal is received by the vertical sync amplifier 26, the rise side, or initial transition, of the pulse triggers the one-shot 27 and the $\bar{Q}$ output goes high, thereby gating the sample and hold circuit 18 into an on condition. When the sample and hold circuit 18 is turned on, the capacitor 19 charges to the voltage level available at the output of the isolation network 14. This output level is proportional to, and can be the same as, the output level of the video amplifier 13 and thus is proportional to the vertical blanking pulse which is applied to the $G_1$ grid of the kinescope 16. The voltage available at the junction 22 is provided as an input to the comparator 23 and is compared to the reference level provided by the reference generator 34 to produce an error signal. The error signal from the comparator 23 is provided to the adder circuit 12 to maintain the voltage applied to the $G_1$ grid at a constant level. Prior to the cessation of the vertical blank signal, the RC network 29 associated with the one-shot 27 times out thereby changing the state of the one-shot 27 and disenabling the sample and hold circuit 18. The values of the capacitor 19 and resistor 21 are selected so that the RC network has a long time constant and the capacitor 19 does not discharge prior to the sample and hold circuit being turned back on. Accordingly, a constant video voltage is applied to the comparator 23 because of the rapid gating of the sample and hold circuit 18 by the one-shot 27.

What is claimed is:

1. A drive level control for testing a kinescope having an element driven by a drive voltage and in which electron beams are scanned in accordance with vertical synchronizing pulses and vertical blanking pulses comprising:
   first means for receiving said vertical blanking pulses and for applying said vertical blanking pulses to said element;
   second means for receiving said vertical blanking pulses and converting said pulses to a voltage proportional to the level of said vertical blanking pulses;
   third means responsive to said vertical synchronizing pulses for gating said second means in accordance with the initial transition of said synchronizing pulses;
   fourth means for providing a reference drive level;
   fifth means responsive to said reference level and to said proportional voltage for providing an error signal, said first means being responsive to said error signal for maintaining said drive voltage at a constant level.

2. The drive level control of claim 1 wherein said second means includes charge storage means for receiving said vertical blanking pulses and converting said blanking pulses to a voltage proportional to the level of said vertical blanking pulses.

3. The drive level control of claim 2 wherein said third means inludes timing means whereby said second means is gated on during the presence of said vertical blanking pulse and turned off prior to the cessation of said vertical blanking pulse.

4. The drive level control of claim 3 wherein said timing means includes a resistance-capacitance network having a time constant less than the duration of said vertical blanking pulse.

5. The drive level control of claim 4 wherein said charge storage means is a capacitor.

6. The drive level control of claim 5 wherein said third means includes a monostable multivibrator.

* * * * *